(12) United States Patent
Hibbert

(10) Patent No.: US 6,976,689 B2
(45) Date of Patent: Dec. 20, 2005

(54) LINKED SUSPENSION SYSTEM FOR A VEHICLE

(75) Inventor: Kirk Hibbert, Goodrich, MN (US)

(73) Assignee: Arctic Cat Inc., Thief River Falls, MN (US)

( * ) Notice: Subject to any disclaimer, the term of this patent is extended or adjusted under 35 U.S.C. 154(b) by 262 days.

(21) Appl. No.: 10/008,455

(22) Filed: Nov. 2, 2001

(65) Prior Publication Data

US 2002/0093168 A1 Jul. 18, 2002

Related U.S. Application Data

(60) Provisional application No. 60/245,757, filed on Nov. 3, 2000.

(51) Int. Cl.[7] .................................................. B60G 9/04
(52) U.S. Cl. ........................ 280/124.159; 280/124.161
(58) Field of Search ................................. 180/190, 191, 180/193; 280/124.154, 124.157, 124.158, 124.159, 124.161, 124.151, 124.116; 267/64.11, 64.13, 64.14

(56) References Cited

U.S. PATENT DOCUMENTS

| | | | |
|---|---|---|---|
| 3,854,710 A | | 12/1974 | Nicholls |
| 3,879,044 A | * | 4/1975 | Estes ........................... 277/651 |
| 4,153,237 A | * | 5/1979 | Supalla ..................... 267/64.15 |
| 4,518,056 A | * | 5/1985 | Kobayashi ............... 423/574.1 |
| 4,798,398 A | | 1/1989 | Cummins |
| 4,919,441 A | * | 4/1990 | Marier et al. .............. 280/21.1 |
| 5,486,018 A | * | 1/1996 | Sakai ..................... 280/124.16 |
| 5,533,586 A | * | 7/1996 | Thompson .................. 180/193 |
| 5,881,834 A | * | 3/1999 | Karpik ....................... 180/193 |
| 6,253,867 B1 | * | 7/2001 | Lillbacka .................... 180/193 |
| 6,382,338 B1 | * | 5/2002 | Forbes ........................ 180/193 |
| 6,390,219 B1 | * | 5/2002 | Vaisanen .................... 180/193 |

FOREIGN PATENT DOCUMENTS

| | | |
|---|---|---|
| EP | 0 891 884 A2 | 1/1999 |
| FR | 1112916 | 3/1956 |
| FR | 2 291 884 | 6/1975 |
| GB | 601731 | 5/1948 |
| GB | 890089 | 2/1962 |
| GB | 1080130 | 8/1967 |
| WO | WO 99/55575 | 11/1999 |

* cited by examiner

*Primary Examiner*—Paul N. Dickson
*Assistant Examiner*—Toan C To
(74) *Attorney, Agent, or Firm*—Black Lowe & Graham; Darren J. Jones

(57) ABSTRACT

A suspension system for a vehicle, having at least first and second shock absorbers. The first shock absorber has a first main piston, and the second shock absorber has a second main piston. The shock absorbers are motively linked such that when the first main piston retracts, the second main piston is also caused to retract. The first and second shock absorbers may be hydraulic shock absorbers, wherein the first shock absorber defines a first hydraulic chamber therein, and the second shock absorber defines a second hydraulic chamber therein, the first and second hydraulic chambers being connected with a hydraulic line, so that causing the first main piston to retract reduces the size of the first hydraulic chamber, which increases the size of the second hydraulic chamber, which then causes the second main piston to retract. The suspension system may include an adjustor for convenient adjusting of the suspension system. The suspension system may include a remote reservoir to accommodate changes in the volumes of the first and second hydraulic chambers.

46 Claims, 1 Drawing Sheet

LINKED SUSPENSION SYSTEM FOR A VEHICLE

BACKGROUND OF THE INVENTION

This invention relates to a suspension system suitable for use with a vehicle, and more particularly to a snowmobile track suspension system wherein the front and rear arms of the suspension are coupled such that the position of the front of the track suspension is determined at least in part by the position of the rear of the track suspension.

Suspension systems for vehicles are well-known. Generally, suspension systems provide a cushioning effect between the body of the vehicle and the surface on which the vehicle travels. This reduces the unwanted motions produced when the vehicle travels over an irregular surface, thereby enabling greater control and safety of operation, as well as providing a more comfortable ride.

Typical suspension systems utilize one or more shock absorbers with springs, hydraulic or pneumatic cylinders, etc., which extend and retract to keep the vehicle in contact with the surface over which it is moving, and which damp themselves to dissipate the energy absorbed in such motion.

Conventional suspension systems may be either unified or independent. Neither type has been entirely satisfactory.

Unified suspension systems utilize a single shock absorber for the vehicle. Unified suspension systems are of only limited value in absorbing unwanted motions. Although they do provide some cushioning, the entire rear suspension is controlled by a single shock absorber. This can cause considerable mechanical stress to both vehicle and passengers, and may result in part of the vehicle losing contact with the surface on which it is traveling.

Independent suspension systems utilize two or more shock absorbers for different parts of the rear suspension. For example, it is known to provide front and rear shock absorbers to control the front and rear halves of a rear suspension separately. Independent suspension systems can absorb motion from uneven terrain more easily, and are more effective at keeping the vehicle in contact with the surface. However, if one of the shock absorbers is required to retract in order to absorb a large motion while the other is not, the vehicle will naturally pitch. An extreme pitch can result in a harsh ride.

SUMMARY OF THE INVENTION

Therefore it is the purpose of the present invention to overcome the deficiencies of the existing designs. It is the purpose of the present invention to provide a suspension system suitable for use with a vehicle that enables generally independent movement of at least two shock absorbers, but that also provides motive coupling between the shock absorbers, so that under certain circumstances the motion of one shock absorber will produce motion in the other.

An embodiment of a suspension system in accordance with the principles of the present invention comprises first and second shock absorbers connected to a vehicle. The first shock absorber comprises a first main piston, and the second shock absorber comprises a second main piston. The first and second shock absorbers are motively linked in such a way that when the first main piston retracts, the second main piston also retracts.

It is preferable that the first and second shock absorbers are hydraulic shock absorbers. It is also preferable that the first shock absorber defines a first hydraulic chamber therein, and that the second shock absorber defines a second hydraulic chamber therein, and that the first and second hydraulic chambers are in hydraulic communication, as by a hydraulic line. As the first main piston retracts, the volume of the first hydraulic chamber decreases. This forces part of the volume of the fluid to be transferred to the second hydraulic chamber, which increases the volume of the second hydraulic chamber, which in turn causes the second main piston to retract.

A variety of additional advantages of the invention will be set forth in part in the description which follows, and in part will be obvious from the description, or may be learned by practice of the invention. The advantages of the invention will be realized and attained by means of the elements and combinations particularly pointed out in the claims. It is to be understood that both the foregoing general description and the following detailed description are exemplary and explanatory only and are not restrictive of the invention as claimed.

BRIEF DESCRIPTION OF THE DRAWINGS

Like reference numbers generally indicate corresponding elements in the figures.

FIG. 2 is a schematic view of an embodiment of a suspension system in accordance with the principles of the present invention, wherein the first main piston is in the extended position.

FIG. 3 is a schematic view of the embodiment shown in FIG. 2, wherein the first main piston is in the retracted position.

DETAILED DESCRIPTION OF THE PREFERRED EMBODIMENT

Figure 1:
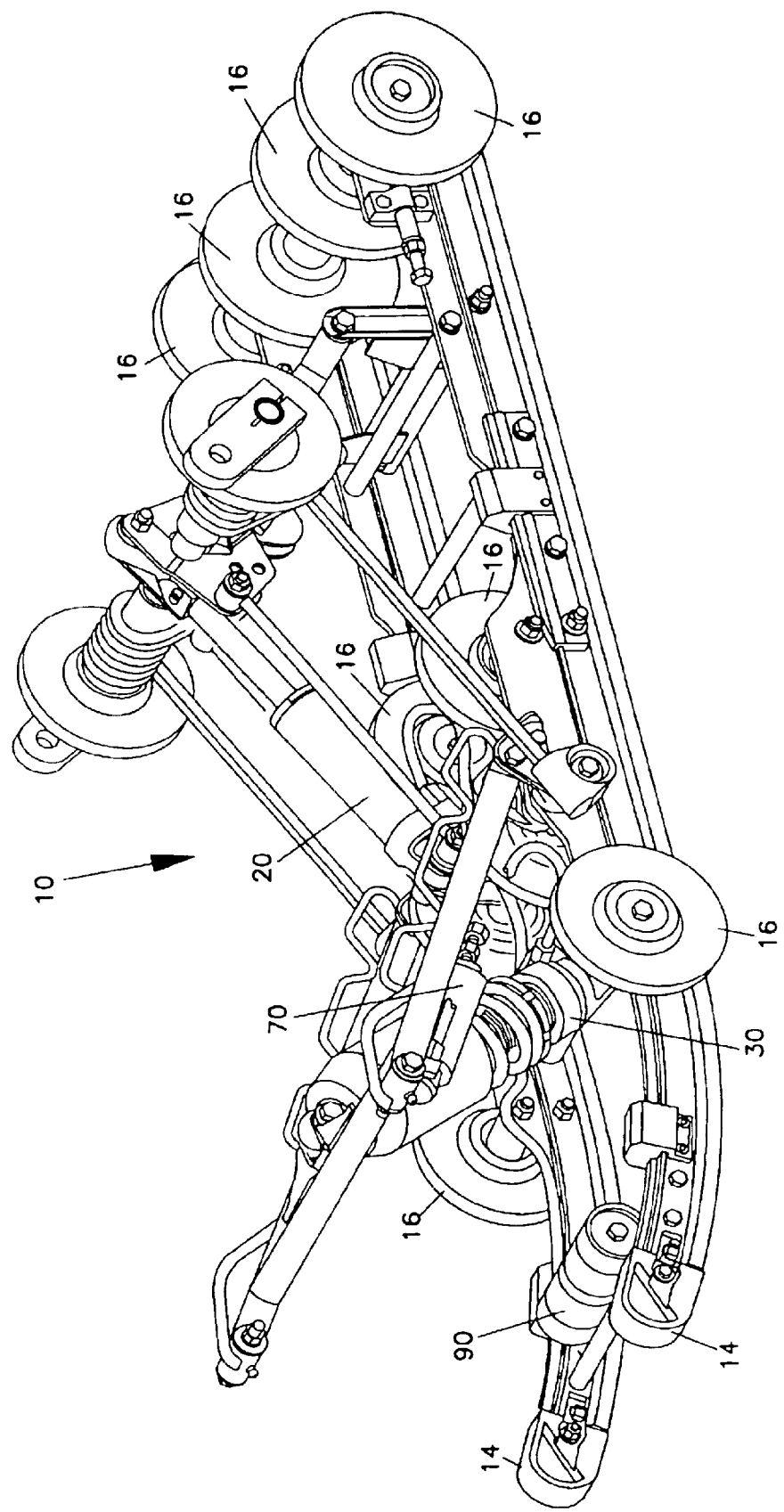
FIG. 1 is a perspective view of an embodiment of a suspension system in accordance with the principles of the present invention.

Referring to FIG. 1, the present invention comprises a suspension system 10 suitable for use with a vehicle. As illustrated, the suspension system 10 is comprised of suspension rails 14 and wheels 16, as would be suitable for a snowmobile. Details of the drive system, steering system, passenger saddle, etc. are omitted for ease of understanding. It will be apparent to those knowledgeable in the art that the present invention may also be suitable for use with other vehicles, including but not limited to motorcycles, four-wheelers, etc. Suitable vehicles are well-known, and are not described in detail herein.

As may be seen most easily in FIGS. 2 and 3, the suspension system 10 comprises a first shock absorber 20 and a second shock absorber 30. It is envisioned that the first shock absorber 20 will be a rear shock absorber controlling and partially supporting the rear of the suspension system 10, and that the second shock absorber 30 will be a front shock absorber controlling and partially supporting the front of the suspension system 10. However, it will be apparent to those knowledgeable in the art that such a configuration is exemplary only, and that other configurations may be equally suitable.

The first shock absorber 20 comprises a first body 21 and first main piston 22, the first main piston 22 being moveably disposed within the first body 21. The first main piston 22 is moveable between a retracted position, wherein it is substantially retracted into the first body 21, and an extended position, wherein it is substantially extended from the first body 21.

The second shock absorber 30 comprises a second body 31 and a second main piston 32, the second main piston 32 being moveably disposed within the second body 31. The second main piston 32 is moveable between a retracted position, wherein it is substantially retracted into the second body 31, and an extended position, wherein it is substantially extended from the second body 31.

The first and second shock absorbers 20 and 30 are motively linked with one another such that when the first main piston 22 is moved towards the retracted position, the second main piston 32 is caused to move towards the retracted position.

It will be apparent to those knowledgeable in the art that this configuration of two shock absorbers is exemplary only, and that other numbers of shock absorbers may be equally suitable.

It is preferable that the first and second shock absorbers 20 and 30 are hydraulic shock absorbers, as hydraulic shock absorbers are easily adapted to the needs of the present invention. However, it will be apparent to those knowledgeable in the art that this design is exemplary only, and that other shock absorbers, including but not limited to pneumatic shock absorbers, may be equally suitable.

The first main piston 22 comprises a first main piston head 24 disposed at a first end 26 of the first main piston 22. The first body 21 defines a first hydraulic chamber 28 therein, the first main piston head 24 being movably disposed within the first hydraulic chamber 28. In such a configuration, the volume inside the first hydraulic chamber 28 is smaller when the first main piston 22 is in the retracted position than when the first main piston 22 is in the extended position.

Advantageously, the first main piston head 24 comprises a first damping valve mechanism 25 for enabling fluid flow through the first main piston head 24 in a controlled manner, so as to minimize cavitation as the first main piston head 24 moves within the first hydraulic chamber 28.

When a first damping valve mechanism 25 is present, it will be appreciated that the first main piston head 24 and the first main piston 22 must be configured relative to the first hydraulic chamber 28 such that fluid within the first hydraulic chamber 28 flows through the first damping valve mechanism 25 of the first main piston head 24 as the first main piston 22 moves between its extended and retracted positions. Advantageously, the first main piston 22, the first main piston head 24, and the first hydraulic chamber 28 are configured such that cavitation within the first hydraulic chamber 28 is avoided or at least minimized as the first main piston 22 and the first main piston head 24 move within the first hydraulic chamber 28.

The second main piston 32 comprises a second main piston head 34 disposed at a first end 36 of the second main piston 32. In the embodiment illustrated, the second shock absorber 30 comprises a separator piston head 38, the separator piston head 38 being moveable independently of the second main piston 32. Advantageously, the separator piston head 38 is moveably disposed on the second main piston 32 proximate the second main piston head 34. The second body 31 and the separator piston head 38 cooperate to define a second hydraulic chamber 40 within the second shock absorber 30. The second shock absorber 30 is configured such that increasing the volume of the second hydraulic chamber 40 causes the separator piston head 38 to press against the second main piston head 34 and/or any hydraulic fluid between the separator piston head 38 and the second main piston head 34, which in turn pushes on the second main piston head 34 thereby causing the second main piston 32 to move toward the retracted position.

Advantageously, the second main piston head 34 comprises a second damping valve mechanism 35 for enabling fluid flow through the second main piston head 34 in a controlled manner, so as to minimize cavitation as the second main piston head 34 moves within the third hydraulic chamber 40.

When a second damping valve mechanism 35 is present, it will be appreciated that the second main piston head 34 and the second main piston 32 must be configured relative to the third hydraulic chamber 40 such that fluid within the third hydraulic chamber 40 flows through the second damping valve mechanism 35 of the second main piston head 34 as the second main piston 32 moves between its extended and retracted positions. Advantageously, the second main piston 32, the second main piston head 34, and the third hydraulic chamber 40 are configured such that cavitation within the third hydraulic chamber 40 is avoided or at least minimized as the second main piston 32 and the second main piston head 34 move within the third hydraulic chamber 40.

The first and second hydraulic chambers 28 and 40 may be in hydraulic communication. Hydraulic communication may be made by a first hydraulic line 50.

The first and second hydraulic chambers 28 and 40 are at least substantially filled with a first hydraulic fluid.

A variety of fluids may be suitable for use as the first hydraulic fluid. Advantageously, the first hydraulic fluid is a hydraulic oil. More advantageously, the first hydraulic fluid is a synthetic hydraulic oil.

The first hydraulic fluid may be a cavitation-resistant synthetic hydraulic oil. Cavitation is the formation and subsequent collapse of voids or bubbles within a fluid, generally caused by rapid and/or turbulent flow of or motion within the fluid.

A variety of suitable oils are available that resist physical and chemical breakdown caused by cavitation, and/or resist cavitation itself. Known cavitation resistant synthetic oils include but are not limited to Maxima and Amzoil.

Advantageously, the first hydraulic fluid is a medium weight oil.

The suspension system 10 may comprise a restrictor 51 disposed between the first and second hydraulic chambers 28 and 40, so as to control fluid flow between the first and second hydraulic chambers 28 and 40. Advantageously, the restrictor 51 is adapted to prevent or at least reduce cavitation of the first hydraulic fluid by controlling the flow of fluid between the first and second hydraulic chambers 28 and 40.

Advantageously, the restrictor 51 is disposed in line with the first hydraulic line 50.

A variety of restrictors 51 suitable for use with the suspension system 10 are known, and are not further described herein.

As may be seen in FIGS. 2 and 3, in such a configuration, when the first main piston 22 is moved toward the retracted position, the volume of the first hydraulic chamber 28 is decreased, whereby the volume of the second hydraulic chamber 40 is increased, whereby the second main piston 32 is caused to move towards the retracted position.

In the configuration illustrated in FIGS. 2 and 3, the first and second main pistons 22 and 32 may be said to be "in phase". That is, when the first main piston 22 moves towards its retracted position, so does the second main piston 32. The second main piston 32 may undergo substantial independent movement.

In other words, when the first main piston 22 retracts, the second main piston 32 retracts similarly. However, motion of the second main piston 32 does not necessarily cause similar motion of the first main piston 22.

The second body 31 and the second main piston head 34 cooperate to define a third hydraulic chamber 42 within the second shock absorber 30.

The third hydraulic chamber 42 is at least substantially filled with a second hydraulic fluid.

A variety of fluids may be suitable for use as the second hydraulic fluid. Advantageously, the second hydraulic fluid is a hydraulic oil. More advantageously, the second hydraulic fluid is a synthetic hydraulic oil.

The second hydraulic fluid may be a cavitation-resistant synthetic hydraulic oil.

Advantageously, the second hydraulic fluid is a medium weight oil.

It will be apparent to those knowledgeable in the art that this particular configuration of shock absorbers is exemplary only, and that other configurations may be equally suitable.

It will be appreciated that, when the second main piston 32 is in the extended position, the separator piston head 38 is in contact with the extended end 41 of the second hydraulic chamber 40. If the separator piston head 38 and the extended end 41 are configured in such a way as to trap only a thin, uniform film of fluid therebetween when the second main piston 32 is in the extended position, the separator piston head 38 and the extended end 41 may become stuck due to adhesion therebetween via the first hydraulic fluid.

Therefore, in an advantageous embodiment the portion of the separator piston 38 that comes in close contact with the extended end 41 has a size and/or shape so as to prevent formation of a thin uniform film of fluid therebetween, and thereby to avoid sticking.

In an alternative advantageous embodiment, the second shock absorber 30 comprises an anti-stick mechanism 43 disposed between the separator piston head 38 and the extended end 41. One suitable anti-stick mechanism 43 is a spacer disposed on the second main piston 32. A spacer having a thickness of as little as approximately 0.040" may be sufficient to prevent sticking. However, it will be appreciated that alternative anti-stick mechanisms may be equally suitable.

The second hydraulic chamber 40 may comprise a central portion 44 and a passage portion 46. The central portion 44 is generally adjacent to the third hydraulic chamber 42, the two being separated by the separator piston 38. The passage portion 46 is configured so as to enable a connection 48 for the first hydraulic line 50 to be mounted to the second shock absorber 30 in a convenient position. The passage portion 46 and the central portion 44 are in hydraulic communication with one another. This provides a convenient system for delivering the first hydraulic fluid from first hydraulic line 50 to the central portion 44.

Advantageously, the passage portion is configured so as to avoid or at least minimize cavitation of fluid flowing therein.

The passage portion 46 may comprise a plurality of holes or tubes disposed peripherally about the central portion 44. In particular, two holes each having a diameter of approximately 0.160" may be suitable.

Alternatively, a passage portion generally in the shape of a hollow, cylindrical shell may be suitable.

It will be apparent to those knowledgeable in the art that these configurations are exemplary only, and that other configurations may be equally suitable.

It is preferable that the suspension system 10 comprises an adjustor 70 for adjusting the suspension system 10. The adjustor 70 allows the "trim", that is, the neutral position of the first and second main pistons, of the suspension system 10 to be set to a desired level.

The adjustor 70 may comprise a adjustor body 71 and an adjustor piston 72, the adjustor piston 72 being moveably disposed within the adjustor body 71. The adjustor piston 72 is advantageously moveable between a retracted position, wherein it is substantially retracted into the adjustor body 71, and an extended position, wherein it is substantially extended from the adjustor body 71.

The adjustor piston 72 comprises an adjustor piston head 74 at a first end 76 thereof. The adjustor body 71 and the adjustor piston head 74 cooperate to define a fourth hydraulic chamber 78 and a first pneumatic chamber 80 within the adjustor body 71. As illustrated in FIGS. 2 and 3, the adjustor 70 is configured such that moving the adjustor piston 72 toward the retracted position causes the volume of the fourth hydraulic chamber 78 to decrease and the volume of the first pneumatic chamber 80 to increase correspondingly, and that moving the adjustor piston 72 toward the extended position causes the volume of the fourth hydraulic chamber 78 to increase and the volume of the first pneumatic chamber 80 to decrease correspondingly. However, this arrangement is exemplary only, and other arrangements may be equally suitable.

In the embodiment illustrated in FIGS. 2 and 3, decreasing the volume of the fourth hydraulic chamber 78 makes a corresponding additional volume of the first hydraulic fluid available to the first and second hydraulic chambers 28 and 40. However, a given change in the volume of the first hydraulic chamber 28 causes a change in the position of the first main piston 22 that is greater than the change in position of the second main piston 32 for an equal change in volume of the second hydraulic chamber 40. Thus, in the embodiment illustrated in FIGS. 2 and 3, decreasing the volume of the fourth hydraulic chamber 78 causes the second main piston 32 to move towards its retracted position. This in turn causes the first main piston 22 to move towards its extended position. Conversely, increasing the volume of the fourth hydraulic chamber 78 causes the second main piston 32 to move towards its extended position, which in turn causes the first main piston 22 to move towards its retracted position.

It will be appreciated that this arrangement is exemplary only, and that the motions of the first and second main pistons 32 and 40 in response to a motion of the adjustor piston 72 may be different for other embodiments of the suspension system 10.

The fourth hydraulic chamber 78 is in hydraulic communication with at least one of the first hydraulic chamber 28, the second hydraulic chamber 40, and the first hydraulic line 50. Hydraulic communication may be enabled by a second hydraulic line 52. The fourth hydraulic chamber 78 is at least substantially filled with the first hydraulic fluid.

The first pneumatic chamber 80 is filled with a first pneumatic fluid. The first pneumatic fluid may be air.

The adjustor piston 72 may comprise adjusting means 82 for enabling convenient adjustment of its position. Suitable adjusting means include but are not limited to screw threads.

The adjustor piston 72 may comprise manipulation means 84 for convenient manipulation of the adjustor piston 72. Suitable means include but are not limited to twist knobs, screw heads, and bolt heads.

The adjustor piston 72 may comprise locking means 86 for securing the adjusting means 82 so that the adjustor piston 72 may be secured in position when it is not being adjusted. Suitable locking means include but are not limited to locking nuts.

It will be apparent to those knowledgeable in the art that this adjustor mechanism is exemplary only, and that suspension systems with other adjustor mechanisms, or no adjustor mechanism, may be equally suitable. In particular, it will be apparent that adjustors without a pneumatic chamber, or having a chamber that is open to the air, may be equally suitable.

It is preferable that the suspension system 10 comprises a remote reservoir mechanism 90 for accommodating motions of the first and second main pistons 22 and 32. As illustrated in FIGS. 2 and 3, this may be accomplished by accommodating changes in the volumes of the first and second hydraulic chambers 28 and 40.

The remote reservoir mechanism 90 comprises a reservoir body 91 and a remote reservoir piston head 92, the remote reservoir piston head 92 being moveably disposed within the reservoir body 91. The reservoir body 91 and the remote reservoir piston head 92 cooperate to define a fifth hydraulic chamber 94 and a pressure means chamber 96 within the reservoir body 91. The remote reservoir mechanism 90 is configured such that an increase in the volume of the fifth hydraulic chamber 94 causes a corresponding decrease in the volume of the pressure means chamber 96, and that a decrease in the volume of the fifth hydraulic chamber 94 causes a corresponding increase in the volume of the pressure means chamber 96. The relative motions of the fifth hydraulic chamber 94 and the pressure means chamber 96 act to compensate for the changes in volume of the third hydraulic chamber 42, as when the second main piston 32 is retracted, when the volume of the fourth hydraulic chamber 78 in the adjustor 70 changes, or when the volume of the first hydraulic chamber 28 in the first shock absorber 20 changes.

The fifth hydraulic chamber 94 is in hydraulic communication with the third hydraulic chamber 42. Hydraulic communication may be made by a third hydraulic line 54.

The fifth hydraulic chamber 94 is at least substantially filled with the second hydraulic fluid.

The pressure means chamber 96 comprises pressure means 97 therein for exerting pressure against the reservoir piston head 92. A variety of pressure means may be suitable.

In an advantageous embodiment, the pressure means 97 comprises a second pneumatic fluid disposed within the pressure means chamber 96. The second pneumatic fluid is advantageously under sufficient pressure to eliminate or at least minimize cavitation of the second hydraulic fluid within and proximate to the fifth hydraulic chamber 94. The second pneumatic fluid may be compressed nitrogen. The second pneumatic fluid may alternatively be compressed air.

In another advantageous embodiment, the pressure means 97 comprises a compression spring disposed within the pressure means chamber 96.

It will be apparent to those knowledgeable in the art that this remote reservoir mechanism is exemplary only, and that other remote reservoir mechanisms or no remote reservoir mechanism at all may be equally suitable.

The suspension system 10 may comprise a bleed-back valve 55 disposed between the third and fifth hydraulic chambers 42 and 94, so as to control fluid flow between the third and fifth hydraulic chambers 42 and 94. Advantageously, the bleed-back valve 55 is adapted to adjustably control the flow of fluid between the third and fifth hydraulic chambers 42 and 94. Control of the flow of fluid between the third and fifth hydraulic chambers 42 and 94 affects the rate at which the first and second shock absorbers 20 and 30 "rebound", or return to their original positions.

Advantageously, the bleed-back valve 55 is disposed in line with the third hydraulic line 54.

Advantageously, the bleed-back valve 55 is adapted to control the flow of fluid between the third and fifth hydraulic chambers 42 and 94 to such a degree that the first and second shock absorbers 20 and 30 provide compressive damping in addition to rebound damping.

A variety of bleed-back valves 55 may be suitable for use with the suspension system 10. For example, a metering rod having a needle and seat arrangement may be suitable. However, bleed-back valves are known, and are not further described herein.

The suspension system 10 may comprise o-rings for sealing various components.

In particular, the separator piston head 38 may comprise an o-ring 39 adapted to prevent fluid flow between the second and third hydraulic chambers 40 and 42.

Similarly, the adjustor piston head 74 may comprise an o-ring 75 adapted to prevent fluid flow between the fourth hydraulic chamber 78 and the first pneumatic chamber 80.

Likewise, the damping piston head 92 may comprise an o-ring 93 adapted to prevent fluid flow between the fifth hydraulic chamber 94 and the second pneumatic chamber 96.

Additionally, the first shock absorber 20 may comprise an o-ring 23 between the first body 21 and the first main piston 22 to prevent leakage of fluid from the first hydraulic chamber 28.

Similarly, the second shock absorber 30 may comprise an o-ring 33 between the second body 31 and the second main piston 32 to prevent leakage of fluid from the second hydraulic chamber 40.

Likewise, the adjustor 70 may comprise an o-ring 73 between the adjustor body 71 and the adjustor piston 72 to prevent leakage of fluid from within the adjustor 70.

However, it will be appreciated that these o-rings are exemplary only, and that embodiments lacking any or all, or having additional o-rings, or having o-rings located elsewhere, may be equally suitable.

Advantageously, the o-rings 23, 33, 39, 73, 75, and 93 are made of material that resists degradation by the fluids with which they come in contact. For example, when the first and second hydraulic fluids are synthetic oils, the o-rings 23, 33, 39, 73, 75, and 93 advantageously may be made of nitrile or fluoroelastomer. However, a variety of other materials may be equally suitable for use with synthetic oils, and with other fluids.

Suitable materials and fittings for shock absorbers beyond those described herein are well known, and are not detailed further herein.

It is noted that, although cavitation is preferably avoided for certain embodiments of the claimed invention, this is exemplary only.

Cavitation is known to contribute to the breakdown of certain hydraulic fluids. It also generally detrimental to the operation of conventional suspension systems.

However, cavitation does not inherently impair the operation of a suspension system 10 in accordance with the principles of the claimed invention. Certain embodiments may be fully operable even under conditions of extreme cavitation.

Furthermore, certain embodiments of a suspension system 10 in accordance with the principles of the claimed invention may derive a positive dynamic effect from cavitation.

The above specification, examples and data provide a complete description of the manufacture and use of the composition of the invention. Since many embodiments of the invention can be made without departing from the spirit and scope of the invention, the invention resides in the claims hereinafter appended.

I claim:

1. A vehicle suspension system, comprising
    a first shock absorber comprising a first main piston disposed therein, said first main piston being moveable between a retracted position wherein said first main piston is substantially retracted within said first shock absorber and an extended position wherein said first main piston is at least partially extended from said first shock absorber;
    a second shock absorber comprising a second main piston disposed therein, said second main piston being moveable between a retracted position wherein said second main piston is substantially retracted within said second shock absorber and an extended position wherein said second main piston is at least partially extended from said first shock absorber;
    wherein said first and second shock absorbers motively linked with one another whereby when said first main piston is moved toward said retracted position, said second main piston is caused to move toward said retracted position;
    said first shock absorber is a hydraulic shock absorber defining a first hydraulic chamber therein, wherein a volume of said first hydraulic chamber is smaller when said first main piston is in said retracted position than when said first main piston is in said extended position;
    said second shock absorber is a hydraulic shock absorber defining a second hydraulic chamber therein, wherein increasing a volume of said second hydraulic chamber causes said second main piston to move toward said retracted position; and
    said second hydraulic chamber being in hydraulic communication with said first hydraulic chamber, wherein decreasing said volume of said first hydraulic chamber increases said volume of said second hydraulic chamber;
    an adjustor comprising an adjustor piston disposed at least partially in said adjustor, said adjustor piston being moveable between a retracted position wherein said adjustor piston is substantially retracted within said adjustor and an extended position wherein said adjustor piston is at least partially said adjustor piston adjusts a neutral position of said second main piston;
    whereby when said first main piston is moved towards said retracted position, said volume of said first hydraulic chamber is decreased, whereby said volume of said second hydraulic chamber is increased, whereby said second main piston moves toward said retracted position.

2. The vehicle suspension system according to claim 1, wherein
    said second shock absorber defines a third hydraulic chamber therein adjacent to said second hydraulic chamber, wherein increasing said volume of said second hydraulic chamber decreases a volume of said third hydraulic chamber.

3. The vehicle suspension system according to claim 2, further comprising
    a remote reservoir mechanism adapted to accommodate motions of said first and second main pistons, said remote reservoir mechanism comprising a remote reservoir piston at least partially disposed in said remote reservoir mechanism, said remote reservoir piston being moveable between a retracted position wherein said remote reservoir piston is substantially retracted within said remote reservoir mechanism and an extended position wherein said remote reservoir piston is at least partially extended from said remote reservoir mechanism;
    said remote reservoir mechanism defining a fifth hydraulic chamber therein in hydraulic communication with said third hydraulic chamber, such that decreasing said volume of said third hydraulic chamber increases a volume of said fifth hydraulic chamber;
    said remote reservoir mechanism defining a pressure means chamber therein in communication with said fifth hydraulic chamber, such that increasing said volume of said fifth hydraulic chamber decreases a volume of said pressure means chamber.

4. The vehicle suspension system according to claim 3, wherein said remote reservoir mechanism comprises at least one o-ring.

5. The vehicle suspension system according to claim 4, wherein
    said at least one o-ring comprises at least one of the group consisting of nitrile and fluoroelastomer.

6. The vehicle suspension system according to claim 3, further comprising
    a bleed-back valve between said third and fifth hydraulic chambers, said bleed-back valve being adapted to control fluid communication between said third and fifth hydraulic chambers.

7. The vehicle suspension system according to claim 2, wherein
    said second hydraulic chamber defines central portion and a passage portion disposed peripherally to said central portion, said passage portion being in hydraulic communication with said first hydraulic chamber, said central portion being in hydraulic communication with said passage portion.

8. The vehicle suspension system according to claim 7, wherein
    said passage portion comprises a plurality of tubes.

9. The vehicle suspension system according to claim 8, wherein
    said tubes are approximately 0.160 inches in diameter.

10. The vehicle suspension system according to claim 7, wherein
    said passage portion comprises one tube.

11. The vehicle suspension system according to claim 7, wherein
    said passage portion comprises a cylindrical shell.

12. The vehicle suspension system according to claim 7, further comprising
    a first hydraulic line connecting said first hydraulic chamber and said passage portion of said second hydraulic chamber.

13. The vehicle suspension system according to claim 3, further comprising
    a third hydraulic line connecting said third and fifth hydraulic chambers.

14. The vehicle suspension system according to claim 3, wherein
    said third and fifth hydraulic chambers are substantially filled with a second hydraulic fluid.

15. The vehicle suspension system according to claim 14, wherein
said second hydraulic fluid is synthetic hydraulic oil.
16. The vehicle suspension system according to claim 3, wherein
said pressure means chamber is substantially filled with a second pneumatic fluid.
17. The vehicle suspension system according to claim 16, wherein
said second pneumatic fluid is compressed nitrogen.
18. The vehicle suspension system according to claim 16, wherein
said second pneumatic fluid is compressed air.
19. The vehicle suspension system according to claim 1, wherein
said adjustor defines a fourth hydraulic chamber therein in fluid communication with said first and second hydraulic chambers such that changing a volume of said fourth hydraulic chamber changes at least one of said volumes of said first hydraulic chambers.
20. The vehicle suspension system according to claim 19, wherein
moving said adjustor piston toward said retracted position decreases a volume of said fourth hydraulic chamber; and
decreasing a volume of said fourth hydraulic chamber increases said volume of said second hydraulic chamber, such that said separator piston moves towards said second main piston, whereby said second main piston moves towards said retracted position thereof.
21. The vehicle suspension system according to claim 19, wherein
said adjustor defines a first pneumatic chamber therein adjacent to said fourth hydraulic chamber, such that increasing a volume of said first pneumatic chamber decreases a volume of said fourth hydraulic chamber; and
decreasing a volume of said fourth hydraulic chamber increases said volume of said first hydraulic chamber, such that said first main piston moves towards said extended position thereof, whereby said second main piston moves towards said retracted position thereof.
22. The vehicle suspension system according to claim 21, wherein
said first pneumatic chamber is substantially filled with a first pneumatic fluid.
23. The vehicle suspension system according to claim 22, wherein
said first pneumatic fluid is air.
24. The vehicle suspension system according to claim 19, further comprising
a second hydraulic line connecting said second and fourth hydraulic chambers.
25. The vehicle suspension system according to claim 19, wherein
said adjustor comprises at least one o-ring.
26. The vehicle suspension system according to claim 25, wherein
said at least one o-ring comprises at least one of the group consisting of nitrile and fluoroelastomer.
27. The vehicle suspension system according to claim 1, further comprising
a first hydraulic line connecting said first and second hydraulic chambers.

28. The vehicle suspension system according to claim 1, wherein
said first, second, and fourth hydraulic chambers are substantially filled with a first hydraulic fluid.
29. The vehicle suspension system according to claim 28, wherein
said first hydraulic fluid is synthetic hydraulic oil.
30. The vehicle suspension system according to claim 1, wherein
at least one of said first and second shock absorbers comprises at least one o-ring.
31. The vehicle suspension system according to claim 30, wherein
said at least one o-ring comprises at least one of the group consisting of nitrile and fluoroelastomer.
32. The vehicle suspension system according to claim 1, further comprising a restrictor between said first and second hydraulic chambers, said restrictor being adapted to control fluid communication between said first and second hydraulic chambers.
33. A vehicle suspension system, comprising
a first hydraulic shock absorber comprising a first main piston at least partially disposed therein, said first main piston defining a first hydraulic chamber, said first main piston being moveable between a retracted position wherein said first main piston is substantially retracted within said first shock absorber to reduce a volume of said first hydraulic chamber, and an extended position wherein said first main piston is at least partially extended from said first shock absorber to expand said volume of said first hydraulic chamber; and
a second hydraulic shock absorber comprising a second main piston disposed therein and a separator piston disposed therein, said second main piston being moveable between a retracted position wherein said second main piston is substantially retracted within said second shock absorber and an extended position wherein said second main piston is at least partially extended from said first shock absorber, said separator piston being axially spaced apart from said second main piston and defining second and third hydraulic chambers within said second hydraulic shock absorber, said second main piston being positioned within said third hydraulic chamber, said second hydraulic chamber decreasing in volume and said third hydraulic chamber increasing in volume as said second main piston moves to said extended position, and said second hydraulic chamber increasing in volume and said third hydraulic chamber decreasing in volume as said second main piston moves to said extended position;
wherein said first and second hydraulic chambers are in fluid communication with one another whereby when said first main piston is moved toward said retracted position, said second main piston is caused to move toward said retracted position; and
wherein said second and third hydraulic chambers are isolated from each other.
34. The system of claim 33, wherein said first main piston comprises a first damping valve, such that fluid within said first hydraulic shock absorber moves through said first damping valve as said first main piston moves between said extended and said retracted positions in such a fashion as to minimize cavitation of said fluid and said second main piston comprises a second damping valve, such that fluid within said second hydraulic chamber moves through said second damping valve as said second main piston moves between said extended and retracted positions in such a fashion as to minimize cavitation of said fluid.

35. A vehicle suspension system, comprising:
a first hydraulic shock absorber comprising a first main piston at least partially disposed therein, said first main piston being moveable between a retracted position wherein said first main piston is substantially retracted within said first shock absorber and an extended position wherein said first main piston is at least partially extended from said first shock absorber,
a second hydraulic shock absorber comprising a second main piston at least partially disposed therein, said second main piston being moveable between a refracted position wherein said second main piston is substantially retracted within said second shock absorber and an extended position wherein said second main piston is at least partially extended from said first shock absorber, and
an adjustor comprising an adjustor piston disposed at least partially in said adjustor, said adjustor piston being moveable between a retracted position wherein said adjustor piston is substantially retracted within said adjustor and an extended position wherein said adjustor piston is at least partially extended from said adjustor;
wherein said first and second shock absorbers are motively linked with one another whereby when said first main piston is moved toward said retracted position, said second main piston is caused to move toward said retracted position; and
wherein moving said adjustor piston adjusts a neutral position of said second main piston.

36. The vehicle suspension system according to claim 35, wherein said first and second main pistons are in phase, such that when said first main piston moves towards said retracted position, said second main piston moves towards said retracted position.

37. The vehicle suspension system according to claim 35, further comprising a remote reservoir mechanism adapted to accommodate motions of said first and second main pistons.

38. The vehicle suspension system according to claim 35, wherein said
first and second shock absorbers comprise hydraulic fluid therein.

39. The vehicle suspension system according to claim 38, wherein said hydraulic fluid is synthetic hydraulic oil.

40. The vehicle suspension system according to claim 38, wherein said hydraulic fluid is a medium-weight hydraulic oil.

41. The vehicle suspension system according to claim 38, wherein said hydraulic fluid is a light-weight hydraulic oil.

42. The vehicle suspension system according to claim 38, wherein said vehicle suspension system is adapted to substantially avoid cavitation of said hydraulic fluid.

43. The vehicle suspension system according to claim 38, wherein said vehicle suspension system is adapted to be operable during cavitation of said hydraulic fluid.

44. A vehicle suspension system, comprising
a first shock absorber comprising a first main piston disposed therein, said first main piston being moveable between a retracted position wherein said first main piston is substantially retracted within said first shock absorber and an extended position wherein said first main piston is at least partially extended from said first shock absorber;
a second shock absorber comprising a second main piston disposed therein, said second main piston being moveable between a refracted position wherein said second main piston is substantially retracted within said second shock absorber and an extended position wherein said second main piston is at least partially extended from said first shock absorber,
wherein said first and second shock absorbers motively linked with one another whereby when said first main piston is moved toward said retracted position, said second main piston is caused to move toward said retracted position;
said first shock absorber is a hydraulic shock absorber defining a first hydraulic chamber therein, wherein a volume of said first hydraulic chamber is smaller when said first main piston is in said retracted position than when said first main piston is in said extended position;
said second shock absorber is a hydraulic shook absorber defining a second hydraulic chamber therein and a third hydraulic chamber therein adjacent to said second hydraulic chamber, wherein increasing a volume of said second hydraulic chamber causes said second main piston to move toward said retracted position and decrease a volume of said third hydraulic chamber;
said second hydraulic chamber being in hydraulic communication with said first hydraulic chamber, wherein decreasing said volume of said first hydraulic chamber increases said volume of said second hydraulic chamber; and
said second hydraulic chamber defines central portion and a passage portion disposed peripherally to said central portion, said passage portion being in hydraulic communication with said first hydraulic chamber, said central portion being in hydraulic communication with said passage portion;
whereby when said first main piston is moved towards said retracted position, said volume of said first hydraulic chamber is decreased, whereby said volume of said second hydraulic chamber is increased, whereby said second main piston moves toward said retracted position.

45. The vehicle suspension system according to claim 44, wherein
said passage portion comprises a plurality of tubes.

46. The vehicle suspension system according to claim 44, wherein
said passage portion comprises a cylindrical shell.

* * * * *